Jan. 9, 1923.
G. R. SMITH.
MOTOR SLEIGH.
FILED JULY 29, 1920.
1,441,538
2 SHEETS-SHEET 1
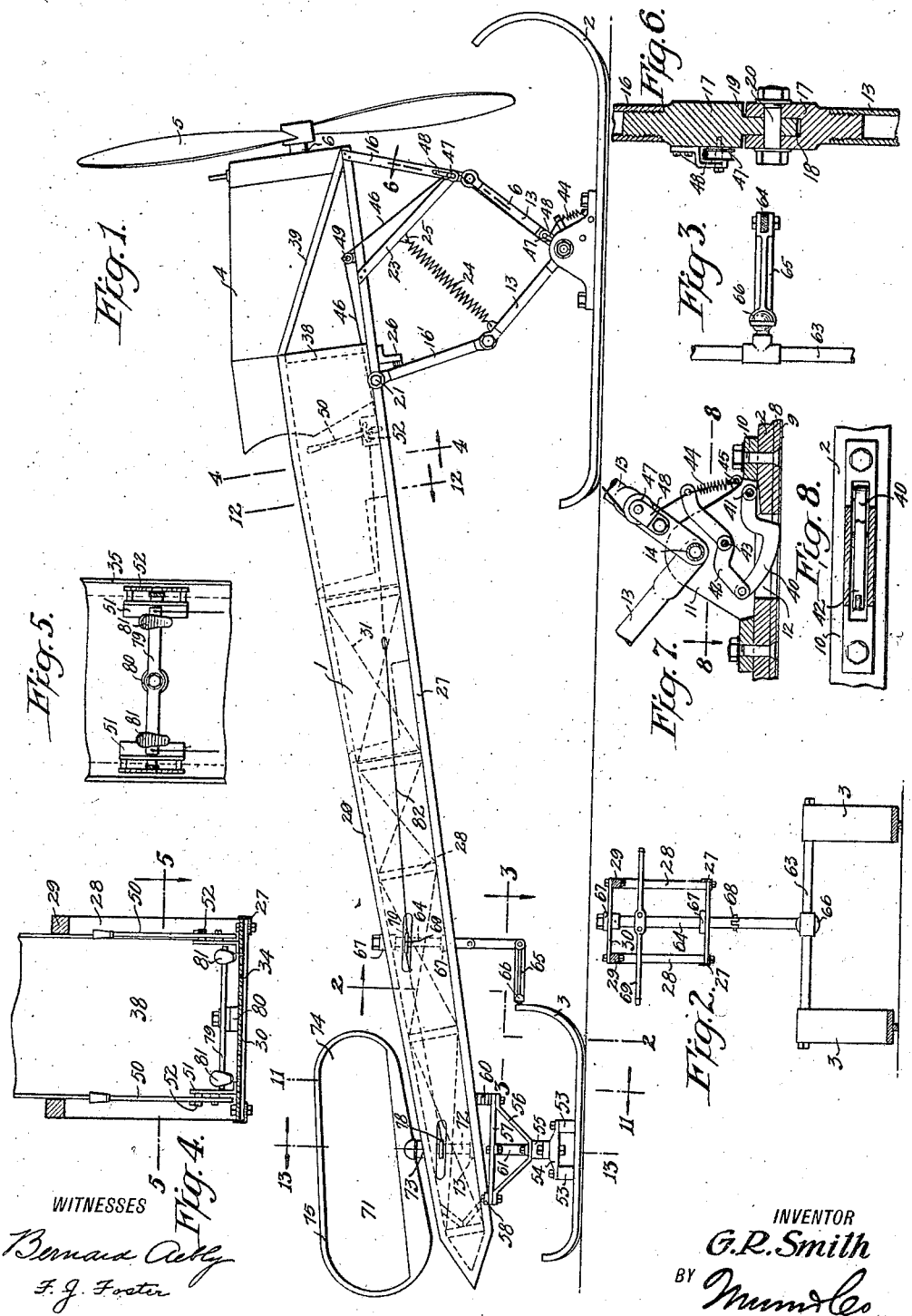
WITNESSES
Bernard Aeby
F. J. Foster
INVENTOR
G.R.Smith
BY Munn & Co
ATTORNEYS

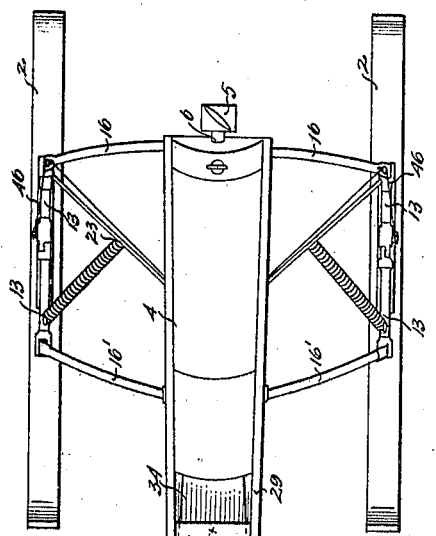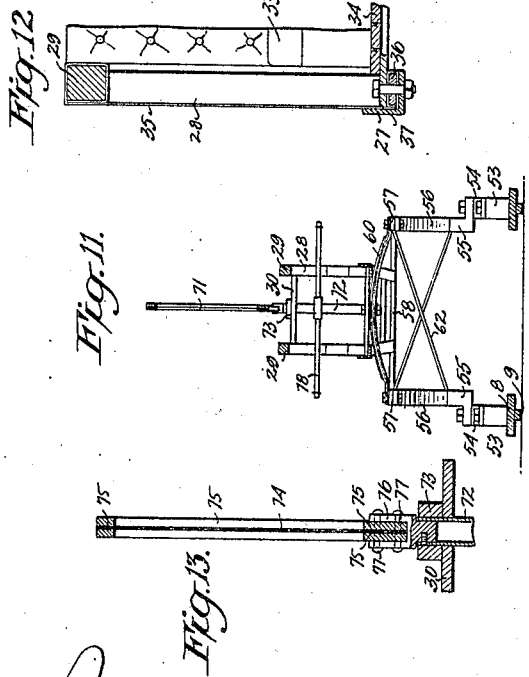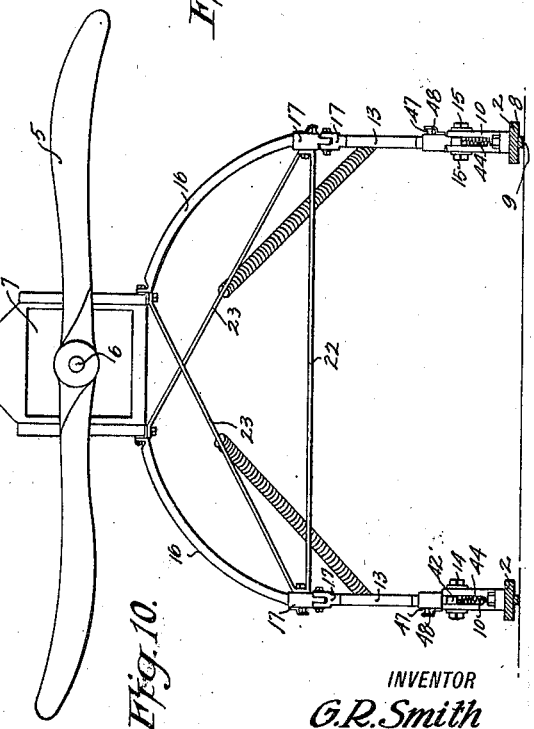

Patented Jan. 9, 1923.

1,441,538

UNITED STATES PATENT OFFICE.

GILBERT ROSCOE SMITH, OF KILGORE, IDAHO.

MOTOR SLEIGH.

Application filed July 29, 1920. Serial No. 399,707.

*To all whom it may concern:*

Be it known that I, GILBERT R. SMITH, a citizen of the United States, and a resident of Kilgore, in the county of Clark and State of Idaho, have invented a new and Improved Motor Sleigh, of which the following is a full, clear, and exact description.

The invention relates to improvements in motor sleighs, an object of the invention being to provide a sleigh in the form of an airplane which is propelled by an engine, the puller type of propeller being mounted on the forward end of the sleigh to propel the same. The invention relates particularly to the construction of the body portion and supporting frame-work of the sleigh, a further object being to provide a shock absorber mechanism in connection with the body supporting frame so that the sleigh will ride easily.

A further object is to provide a device of this type which will make fast time over any kind of snow whether it be well packed, soft or crusted.

A further object is to provide a motor sleigh with an improved construction of steering means and brake mechanism and one which will be both comfortable and safe to travel in, which will be relatively light in weight and yet strong, durable and practical in use.

A further object is to provide a motor sleigh which is especially adapted for carrying mail or supplies over land in sections where it is now necessary to use dog teams or similar transportation means in winter.

With these and other objects in view the invention consists in certain novel features of construction and combinations and arragements of parts which will be more fully hereinafter described and pointed out in the claims.

In the accompanying drawings:

Figure 1 is a view in side elevation of my improved motor sleigh.

Fig. 2 is a view in transverse section on the line 2—2 of Figure 1.

Fig. 3 is a fragmentary top plan view of a part of the steering mechanism taken on the line 3—3 of Figure 1.

Fig. 4 is a view in transverse section on the line 4—4 of Figure 1.

Fig. 5 is a view in section on the line 5—5 of Figure 4.

Fig. 6 is a fragmentary view in vertical section on the line 6—6 of Figure 1.

Fig. 7 is a fragmentary detail view partly in section of the brake mechanism.

Fig. 8 is a view in longitudinal section on the line 8—8 of Figure 7.

Fig. 9 is a top plan view.

Fig. 10 is a view in front elevation.

Fig. 11 is a view in transverse section on the line 11—11 of Figure 1.

Fig. 12 is a fragmentary view in transverse section of one side of the body frame on the line 12—12 of Figure 1.

Fig. 13 is a view in transverse section through the rudder.

Referring in detail to the drawings, the vehicle comprises a body portion simulating the fuselage of an airplane supported at its forward end on a pair of runners 2 and at its rear end on a second pair of runners 3. A hood 4 is formed at the forward end of the body portion and is adapted to enclose any preferred type of airplane engine. A propeller 5 is mounted in front of the hood 4, on a drive shaft 6, which projects forwardly through the radiator 7 of the engine. The runners 2 are relatively wide as shown clearly in Fig. 5. These runners are forwardly bowed at their front ends and slightly upturned at their rear ends. A thin strip 8 of wood or other suitable material is secured to the under face of the runners 2, and a metal shoe 9 is provided on the under face of the strip.

Blocks 10 are bolted to the runners 2 and have slots 11 therein registering with slots 12 in the runners for the accommodation of the brake mechanism which will be described hereinafter. A pair of tubular supports 13 have their lower ends flattened and secured together in each of the slots 11 by means of a tubular bolt 14 extending through the block 10 and receiving nuts 15 at each side of the block.

Two pairs of outwardly bowed tubular supports 16 and 16′ are secured to the sides of the forward end of the framework of the body portion 1. As illustrated in Fig. 6, the lower ends of the supports 16 and 16′ and the upper ends of the tubular supports 13 are internally screw-threaded to receive the threaded ends of coupling members 17. One of these coupling members is bifurcated as shown at 18, and the other coupling member is provided with a tongue 19 fitting within the bifurcation and secured therein by a bolt 20. The members 16′ are pivotally secured to the body as shown at 21, while the members 16 have rigid connection therewith. A transverse brace 22 secures together the coupling members 17 and diagonal braces 23 connect the members 16 to opposite sides of the body of the framework. The supporting members 16' and 13 thus form a pair of toggle levers which are connected to the braces 23 by means of springs 24. The springs 24 are coiled and have one end secured in a staple or other securing device 25 in the central portion of the braces 23 and their other ends secured to the rear tubular members. These springs form shock absorbers for the vehicle. The springs 24 at all times exert a forward pull on the rear tubular members 13 as will be understood, and it is necessary to provide cushioning blocks 26 under the body portion to limit the forward movement of the rear members 16'.

The body portion 1 of the vehicle is inclined, the forward end being higher than the rear end. The body portion is rectangular in cross section and tapers toward its rear end. It is comprised of a pair of longitudinal bars 27, preferably of angle iron, and uprights 28 secure the bars 27 to longitudinal bars 29 above the same. Cross pieces 30 secure the side bars together, and wires or braces 31 may also be employed to strengthen the framework.

A compartment 32 is formed in the body of the vehicle, seats 33 being located in this compartment on flooring 34 laid between the bars 27 in this portion of the body. The sides of the body are covered with canvas 35 from the hood back, and the top and bottom thereof may also be covered with canvas from the compartment 32 rearwardly. Fig. 12 illustrates one way to secure the canvas to the sides of the body. The canvas is wrapped around the bars 29, then brought down and wrapped around the board 36 which is securely bolted beween the angle iron bars 27 and a board 37 which supports the flooring 34.

A partition 38 separates the compartment 32 from the engine, and inclined braces 39 extend from the end of the bars 29, which terminate at the partition 38, to the forward end of the bars 27, these braces 39 passing along the outside of the hood 4.

I provide a pair of brakes 40, which are precisely alike and hence a description hereinafter of one will apply to both. Each of the forward runners 2 carries a brake shoe 40, which is located in the slot 11 of the block 10, and which operates downwardly through alined slots in the runners 2 and at its forward end is pivoted on a pin 41 in the forward end of the slot 11. This shoe 40 is pivotally connected to a brake lever 42, the latter fulcrumed on a pin 43 in the slot 11. A coil spring 44 secured to an eye 45 in the block 10 and to the end of the lever 42, normally exerts pressure on the lever to hold the brake shoe 40 off the ground. A flexible connecting device 46 is secured to the end of the brake lever 42, passed around grooved pulleys 47 secured to the forward tubular supports 13 and 16 by means of angle brackets 48, thence around a grooved pulley 49 on the bar 27, and then secured to an operating lever 50 in the compartment 32. The lever 50 is fulcrumed on an angle bracket 51 secured in the flooring of the compartment 42 and may be locked in any desired position in a notched sector bar 52. It is to be understood that two of these brake operating mechanisms are provided, each having a separately controlled lever and sector bar 52.

The supporting frame for the rear end of the body 1 comprises a pair of blocks 53 secured to each runner 3. Blocks 54 are bolted to the blocks 53 and angle blocks 55 are pivotally mounted on the blocks 54. V-shaped supporting braces 56 are bolted to the blocks 55. Longitudinal bars 57 connect the ends of these braces 56 and the body 1 is supported on a cross piece 58 connecting the rear ends of the bars 57 and on a leaf spring 60 connecting the forward ends of these bars. Brackets 61 and diagonal braces 62 may also be used to strengthen the rear framework, as shown clearly in Figs. 1 and 11.

The construction above described of the braces 56, the bars 57 and 58, the spring 60, the bracket 61, and the braces 62, forms a supporting truck for the rear of the vehicle, which truck is pivotally mounted on the runners 3 and allows independent movement of these runners. The forward upturned ends of the runners 3 are connected by a cross piece 63, a vertical tubular rod 64 being mounted in bearings 67 in the body 1 and projecting downwardly below the body. A link 65 connects the lower end of the rod 64 with the cross piece 63. The link 65 and cross piece 63 preferably have a ball-and-socket connection 66, as shown clearly in Fig. 3. The rod 64 may be formed in two parts, with any preferred form of flexible connection at 68, to absorb jars caused by the runners 3 passing over unusual bumps or obstructions in the snow, and to permit slight rearward movement of the lower end of the rod 64 and of the link 65 upon turning of the rear runners. A transversely extending lever 69 is secured to the rod 64 within the body 1, and has its ends projecting through openings 70 in the canvas covering of the body.

A rudder 71 is secured above the rear end of the body on a tubular rod 72, which is mounted in bearings 73 in the body. The rudder 71 comprises a piece of canvas 74 secured between two substantially oval-shaped wooden frames 75, as shown in Fig. 13. Fig. 13 also illustrates a convenient way of securing a rudder 71 to the rod 72 wherein a bifurcated block 76 is secured in the upper end of the rod 72, and the rudder 71 is then secured in the bifurcated portion by means of bolts 77. A lever 78 similar to the lever 69 is provided on the rod 72. Flexible connecting devices 82 connect the ends of the levers 69 and 78 with the ends of a foot-operated steering bar 79 mounted in the compartment 32 between the brake control levers 50, on a bearing 80 secured to the floor of the compartment. The steering bar 79 is provided with pedals 81 adjacent each end thereof to accommodate the feet of the operator. Between the steering bar 79 and the lever 69, the flexible connecting devices pass through openings in the canvas walls of the compartment 32.

It is of course to be understood that the rudder 71 and the runners 3 are steered simultaneously by movement of the steering bar 79. The wind on the rudder aids materially in steering the device and either of the brakes may be employed in addition to the steering mechanism when it is desired to make a sudden turn. The springs in the supporting frames of the device cause it to ride easily, the wide runners adapt it for use with any kind of snow, and the distance which the forward runners are spaced apart obviate any danger of the sleigh turning over.

While I have illustrated the preferred embodiment of the sleigh, it is apparent that various slight changes and alterations might be made in the general form of the parts described without departing from my invention, and hence I do not limit myself to the precise details set forth but consider myself at liberty to make such changes and alterations as fairly fall within the spirit and scope of the appended claims.

What is claimed is:

1. A sleigh comprising an elongated body, a pair of runners at both ends of the body, cushion frames interposed between the body and the runners, said body having a compartment therein, blocks secured to the forward runners and having slots therein, said forward runners having slots therein registering with the slots in the blocks, ground brakes located in said slots, said brakes comprising brake shoes operating in the alined slots, brake levers fulcrumed in said slots and pivotally connected to said shoes, coil springs normally holding the brake shoes in the slots, operating levers in said compartment, flexible devices connecting said operating levers and brake levers, and notched sector bars in the compartment controlling the position of said operating levers.

2. A sleigh comprising an elongated body, a pair of runners at both ends of the body, cushion frames interposed between the body and the runners, a cross piece connecting the forward ends of the rear runners, alined bearings secured to the body, a tubular rod mounted in the bearings and extending below the body, a link connecting said rod and cross piece, a steering lever on said rod, a similarly mounted rod secured in the body and supporting a rudder on the rear end of the body, a steering lever on said last-mentioned rod, and means for simultaneously operating both of said levers.

3. A sleigh comprising an elongated body, a pair of runners at both ends of the body, cushion frames interposed between the body and the runners, a cross piece connecting the forward ends of the rear runners, alined bearings secured to the body, a tubular rod mounted in the bearings and extending below the body, a link connecting said rod and cross piece, a steering lever on said rod, a similarly mounted rod secured in the body and supporting a rudder on the rear end of the body, a steering lever on said last-mentioned rod, a pedal operated steering bar mounted in the body, flexible devices connecting the steering bar with both of said levers, whereby a movement of the steering bar turns the rear runners and rudder simultaneously in the same direction.

4. A sleigh comprising an elongated body, a pair of runners at both ends of the body, cushion frames interposed between the body and the runners, a forward frame comprising a pair of outwardly bowed tubular members rigidly secured to the forward end of the body, another pair of outwardly bowed tubular members pivotally secured to the body, blocks secured to the forward runners having slots therein, and two pairs of supports having their ends located in said slots and connected to both pairs of bowed tubular members.

5. A sleigh comprising an elongated body, a pair of runners at both ends of the body, cushion frames interposed between the body and the runners, a forward frame comprising a pair of outwardly bowed tubular members rigidly secured to the forward end of the body, another pair of outwardly bowed tubular members pivotally secured to the body, blocks secured to the forward runners having slots therein, two pairs of supports having their ends located in said slots, flexible coupling members connecting said supports and bowed tubular members, diagonal braces connecting the forward pair of coupling members to the body, coil springs connecting said braces to the rear pair of coupling members, and cushion blocks under the body limiting the forward movement of the pivoted tubular members.

6. A sleigh comprising an elongated body, a pair of runners at both ends of the body, cushion frames interposed between the body and the runners, blocks on each of the rear runners, means connecting said blocks and supported thereon, angle blocks pivotally secured upon said means, said rear supporting frame comprising a truck rigidly mounted on the angle blocks and supporting the rear end of the body, and a flexible steering gear for turning said rear runners independently of the truck.

7. A sleigh comprising an elongated body, a pair of runners at both ends of the body, cushion frames interposed between the body and the runners, blocks on each of the rear runners, means connecting said blocks and supported thereon, angle blocks pivotally secured upon said means, said rear supporting frame comprising a truck rigidly mounted on the angle blocks and supporting the rear end of the body, a flexible steering gear for turning said rear runners independently of the truck, said body having a compartment therein, and means in said compartment for operating the steering gear.

GILBERT ROSCOE SMITH.